United States Patent [19]

Branton, Jr. et al.

[11] Patent Number: 5,845,062

[45] Date of Patent: Dec. 1, 1998

[54] SYSTEM AND METHOD FOR MONITORING NETWORK ELEMENTS ORGANIZED IN DATA COMMUNICATION CHANNEL GROUPS WITH CRAFT INTERFACE PORTS

[75] Inventors: Robert A. Branton, Jr., Farmers Branch; John Mark DeMoss, The Colony, both of Tex.

[73] Assignee: MCI Communications Corporation, Washington, D.C.

[21] Appl. No.: 671,029

[22] Filed: Jun. 25, 1996

[51] Int. Cl.⁶ ........................................... G08F 11/30
[52] U.S. Cl. ............................ 395/183.01; 395/183.19; 395/200.53; 395/200.54
[58] Field of Search .................. 395/183.01, 183.19, 395/200.53, 200.54; 371/20.1; 370/241–258

[56] References Cited

U.S. PATENT DOCUMENTS

| | | | |
|---|---|---|---|
| 4,937,825 | 6/1990 | Ballard et al. ........................... | 371/20.1 |
| 5,157,667 | 10/1992 | Carusone, Jr. et al. ................ | 371/29.1 |
| 5,189,674 | 2/1993 | Shimizu .................................. | 370/20.1 |
| 5,226,120 | 7/1993 | Brown et al. ....................... | 395/200.54 |
| 5,233,600 | 8/1993 | Pekarske .................................. | 370/14 |
| 5,285,494 | 2/1994 | Sprecher et al. ........................... | 379/59 |
| 5,299,201 | 3/1994 | Carusone, Jr. et al. .................. | 371/51 |
| 5,309,509 | 5/1994 | Cocklin et al. ........................... | 379/165 |
| 5,313,465 | 5/1994 | Perrlman et al. ........................ | 370/254 |
| 5,412,652 | 5/1995 | Lu ........................................ | 370/85.12 |
| 5,436,909 | 7/1995 | Dev et al. ............................... | 371/20.1 |
| 5,450,601 | 9/1995 | Okuda ................................. | 395/200.54 |
| 5,452,306 | 9/1995 | Turudic et al. ....................... | 370/110.1 |
| 5,455,832 | 10/1995 | Bowmaster ............................. | 371/20.1 |
| 5,457,797 | 10/1995 | Butterworth et al. .................. | 395/682 |
| 5,463,634 | 10/1995 | Smith et al. ........................... | 371/20.6 |
| 5,475,625 | 12/1995 | Claschick ........................... | 395/200.54 |
| 5,483,520 | 1/1996 | Eychenne et al. ..................... | 370/16.1 |
| 5,491,796 | 2/1996 | Wanderer et al. ................. | 395/200.54 |
| 5,513,171 | 4/1996 | Ludwiczak et al. ..................... | 370/13 |
| 5,555,375 | 9/1996 | Sudama et al. ..................... | 395/200.56 |
| 5,566,162 | 10/1996 | Gruber et al. ........................... | 370/13 |
| 5,606,664 | 2/1997 | Brown et al. ....................... | 395/200.54 |

OTHER PUBLICATIONS

Banerjee et al., "ISDN Primary Rate Access Maintenance," *IEEE*, 1989, pp. 2.6.1–2.6.5.

Cadieux et al., "A New Network Element for Performance Monitoring and Test Access Spanning the Digital Hierarchy," *IEEE*, 1990, pp. 324.4.1–334.4.5.

Kerschberg et al., "Intelligent Network Management: A Heterogeneous Knowledge Source Approach," *IEEE*, 1990, pp. 314–316.

Mageed et al., "Fault Detection and Indentification Using a Hierarchical Neural Network–Based System, "*IEEE*, 1993, pp. 338–343.

*Primary Examiner*—Lance Leonard Barry

[57] ABSTRACT

A system and method for retrieving network element data. A routing network enables one or more collectors to connect to any network element within a service provider's network via craft interface ports. The collectors are controlled by the service provider and store the retrieved network element data in a service provider database.

17 Claims, 6 Drawing Sheets

SYSTEM AND METHOD FOR MONITORING
NETWORK ELEMENTS ORGANIZED IN
DATA COMMUNICATION CHANNEL
GROUPS WITH CRAFT INTERFACE PORTS

CROSS REFERENCE TO OTHER
APPLICATIONS

The following applications of common assignee contain some common disclosure as the present application:

U.S. Pat. application entitled "System and Method for Identifying the Technique Used for Far-End Performance Monitoring of a DS1 at a Customer Service Unit", filed Jun. 25, 1996, Ser. No. 08/671,028.

U.S. Pat. application entitled "System and Method for Formatting Performance Data In a Telecommunications System", filed Jun. 26, 1996, Ser. No. 08/670,905.

U.S. Pat. application entitled "System and Method for Reported Root Cause Analysis", filed Jun. 26, 1996, Ser. No. 08/670,844.

U.S. Pat. application entitled "System and Method for Unreported Root Cause Analysis", filed Jun. 28, 1996, Ser. No. 08/670,516.

U.S. Pat. application entitled "Enhanced Correlated Problem Alert Signals", filed Jun. 28, 1996, Ser. No. 08/670,848.

U.S. Pat. application entitled "Correlated Problem Alert Signals", filed Jun. 28, 1996, Ser. No. 08/673,271.

U.S. Pat. application entitled "Raw Performance Monitor Correlated Problem Alert Signals", filed Jun. 28, 1996, Ser. No. 08/670,847.

U.S. Pat. application entitled "System and Method for Reported Trouble Isolation", filed Jun. 28, 1996, Ser. No. 08/672,812, now U.S. Pat. No. 5,704,036.

U.S. Pat. application entitled "System and Method for Unreported Trouble Isolation", filed Jun. 28, 1996, Ser. No. 08/672,513.

U.S. Pat. application entitled "Monitor Point Identification", filed Jun. 28, 1996, Ser. No. 08/672,512.

U.S. Pat. application entitled "Service Management Layer Threshold Setting", filed Jun. 28, 1996, Ser. No. 08/670,845.

U.S. Pat. application entitled "Monitor Point Activation", filed Jun. 28, 1996, Ser. No. 08/672,356.

The above-listed applications are incorporated herein by reference in their entireties.

BACKGROUND OF THE INVENTION

1. Field of the Invention

The present invention relates generally to telecommunication network management, and more specifically is directed toward a system and method for increasing the visibility and availability of network element data to a service provider.

2. Related Art

There is an ongoing need to improve network monitoring techniques at all levels, from the network element level up through the highest system level. Network elements have traditionally been used to provide a detailed predefined set of network element performance data. Examples of performance data and alarm information that can be retrieved from a network element include the number of errored seconds, severely errored seconds, path alarm indication signals, etc.

FIG. 1 illustrates an example of a conventional vendor-controlled network management system 100 that retrieves network performance data from a group of network elements 110. In this network management system, operations controller (OPC) 130 is connected to network elements 101 and 104 via CNet connections 122 and 124, respectively. Network elements 101–104 are referred collectively as OPC group 110. Network elements 101–104 are interconnected by links 111–113. Links 111–113 represent either intrasite or intersite connections. Intrasite connections can be provided by CNet bridge cables, while intersite connections can be provided via the synchronous optical network (SONET) defined data communications channel (DCC) overhead bytes.

In operation, OPC 130 periodically interrogates the computer resident within each network element 101–104. Network elements 101–104 provide OPC 130 with performance and status information. OPC 130 then provides the collected information to network manager 140. Network manager 140 retrieves performance and status information from a plurality of network element groups via a plurality of OPCs (not shown).

In this conventional network management system 100, the service provider (e.g., MCI Telecommunications Corporation) does not control the content and distribution of the retrieved performance data. Rather, the network element vendors that sell the hardware retain control over both the network management software and the collected data. Specifically, network elements 101–104 are programmed by the vendor to provide only basic predefined information to OPC 130. The retrieved data is then stored in a database that is also controlled by the vendor. Finally, the vendor generates predefined reports that are provided to the service provider on a network element basis. Effectively, vendors dictate both the type and format of data that is provided to the purchasers of the network elements.

In this situation, a service provider has limited access to its own network data. Customization of the data to be retrieved and the provision of aggregate network-wide reports can be accomplished only through requests to the vendor. This request process is often inefficient and expensive. What is needed is a system and method for maximizing (1) the types of data that are extracted from the network elements, and (2) the availability of the extracted data to the service provider for subsequent analysis.

SUMMARY OF THE INVENTION

The present invention satisfies the above mentioned needs by providing a network management system that is controlled by the service provider. This network management system comprises a plurality of collectors that communicate with a desired network element via a switch 56 network. In a preferred embodiment, the network is divided into one or more data communications channel (DCC) groups that include one or more network elements with craft interface ports directly connected to the switch 56 network.

The network management system first receives a request from a user. The user request includes information that identifies a network element and the type of information sought to be retrieved from the network element. Based upon this user request, the network management system identifies a DCC group that includes the network element. Next, the network management system identifies one of the network elements in the identified DCC group that has a craft interface port directly connected to the switch 56 network.

After this identification process, the network management system directs a collector to initiate a call to the network element having a direct connection to the switch 56 network.

Through this connection, the collector can access any other network element within the DCC group. The data retrieval process begins after the desired network element is accessed.

Data retrieval is facilitated by the collector's emulation of a VT100 terminal. After navigating through a series of craft interface menus, the collector extracts the desired data from the screen display data that is received from the network element. The extracted data is stored in a database that can be accessed by any user that is associated with the service provider.

The foregoing and other features and advantages of the invention will be apparent from the following, more particular description of a preferred embodiment of the invention, as illustrated in the accompanying drawings.

BRIEF DESCRIPTION OF THE FIGURES

In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS

The present invention addresses the general problem of effectively retrieving and managing network data that is obtained from thousands of network elements under the control of a single service provider. As noted above, conventional network management system 100 is controlled by the vendor. The vendor not only limits the type of data that are retrieved by OPC 130 but also limits the types of reports that are provided to the service provider. With this limited amount of information, the service provider cannot optimally manage the network. Modifications to this vendor-defined process have proven to be expensive, time-consuming and inflexible.

The present invention is generally designed to increase a service provider's control over the acquisition and analysis of network management data. In the acquisition phase, the present invention increases the types of data that can be retrieved from the network elements. In the analysis phase, the storage of the retrieved data in a service provider controlled database allows the service provider to more effectively analyze and optimize the performance of the network.

Figure 1:
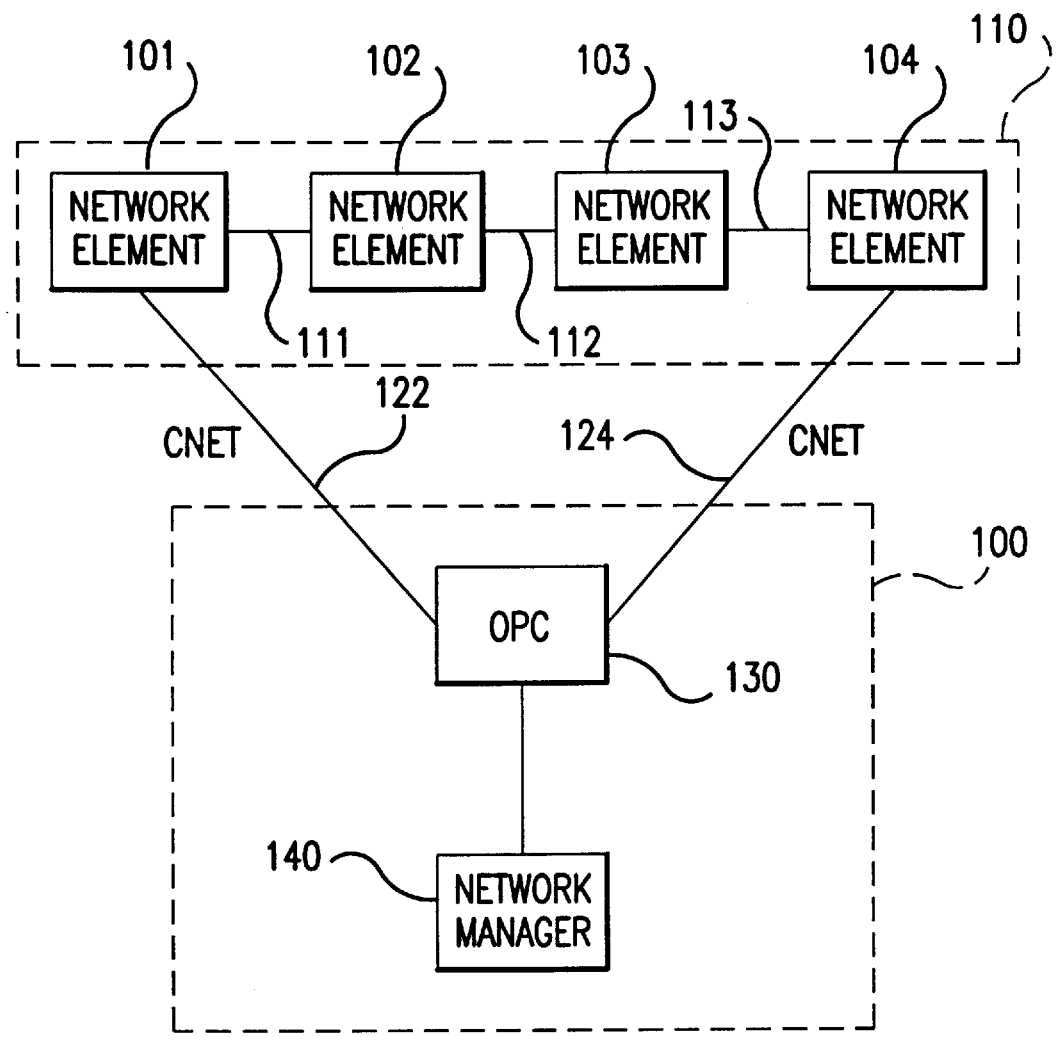
FIG. 1 illustrates a conventional network management system.
Figure 2:
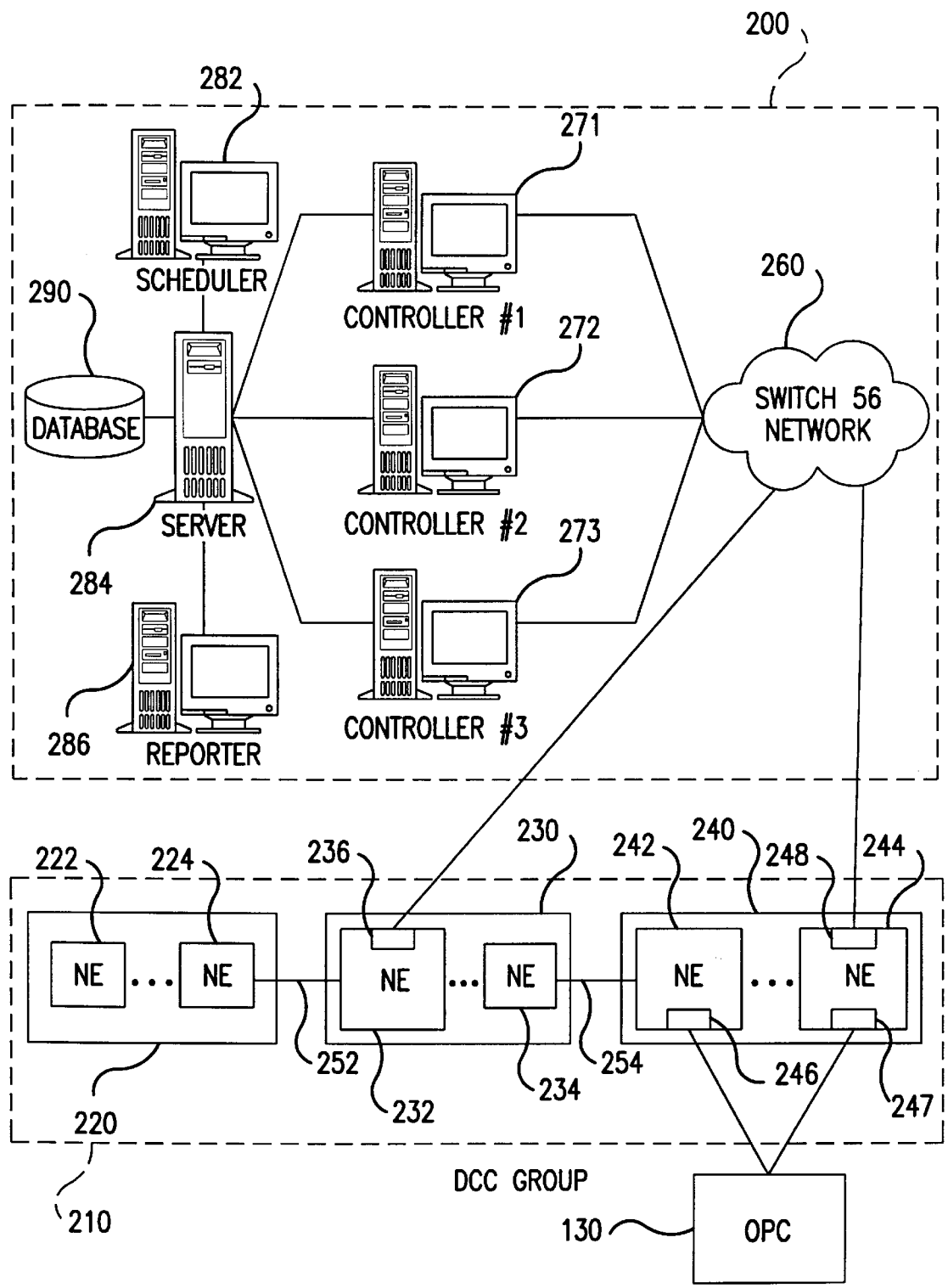
FIGS. 2 and 3 illustrate a network management system according to the present invention.

FIG. 2. illustrates a preferred embodiment of a customer-controlled network management system 200. Network management system 200 includes switch 56 network 260 that connects any one of collectors 271–273 to any network element in the service provider's network. Switch 56 network 260 is a controlled 56 kbit/s routing network. A collector 271–273 initiates a connection by first dialing the number that is associated with a network element 232, 244 that is directly connected to switch 56 network 260. These directly connected network elements 232, 244 allow access to any network element in data communications channel group (DCC) 210.

Each collector 271–273 has eight ports in which to connect to switch 56 network 260. In combination collectors 271–273 can make 24 simultaneous calls to network elements scattered throughout the network. In an alternative embodiment, collectors 271–273 are connected to network elements 222, 224 via a private-line network.

Network management system 200 also includes scheduler 282, reporter 286, server 284 and database 290. Scheduler 282 coordinates the retrieval of data by collectors 271–273. Reporter 286 generates customized reports that are based on the collected information that is stored in database 290. These customized reports are defined by the service-provider. Finally, server 284 coordinates the data retrieval and analysis processes that are initiated by user requests.

Figure 3:
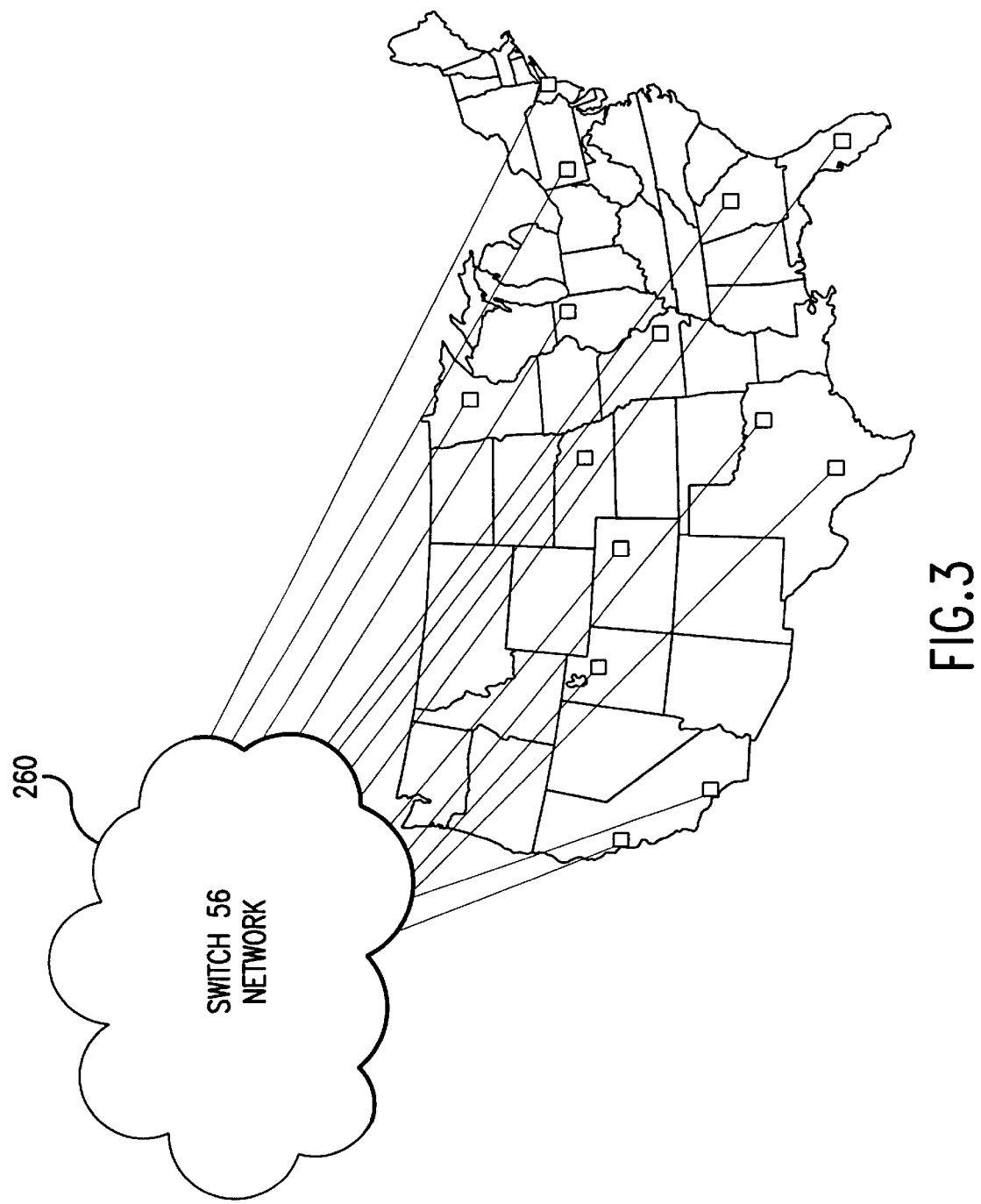

As illustrated in FIG. 3, switch 56 network 260 permits collectors 271–273 to directly connect to a subset of network elements that are scattered throughout a national network. This subset of network elements provides a connection point between collectors 271–273 and the network elements within the various DCC groups. FIG. 2 illustrates an example of a single DCC group 210. DCC group 210 includes a plurality of OPC groups 220,230,240. OPC groups 220,230,240 are interconnected by communication links 252, 254. Communication links 252, 254 can represent a communication channel established via the SONET DCC overhead bytes. As defined in the context of network management system 100, each OPC group 220, 230, 240 is associated with a single OPC 130. For convenience, only OPC 130 associated with network element group 240 is shown.

OPC groups 220, 230, 240 each include a plurality of network elements. OPC group 220 includes network elements 222 and 224, OPC group 230 includes network elements 232 and 234, and OPC group 240 includes network elements 242 and 244. With reference to OPC group 240, OPC 130 interfaces with network elements 242 and 244 via CNet ports 246 and 247, respectively. As noted above, CNet ports 246 and 247 allow vendor-controlled OPC 130 to retrieve a basic vendor-defined information set from each of the network elements in OPC group 240.

In contrast to the vendor-controlled interface via CNet ports 246 and 247, network management system 200 interfaces with the network elements in DCC group 210 via craft interface ports 226 and 248 on network elements 232 and 244, respectively. One or more connection points between switch 56 network 260 and a DCC group can exist. Craft interface ports 236 and 248 represent the connection points between collectors 271–273 and each of the network elements 222,224,232,234,242,244 in DCC group 210. In other words, the connection points at craft interface ports 236, 248 allow collectors 271–273 to interrogate the computer that is resident in any network elements in DCC group 210. This method of interrogation capitalizes on the provision of internal data processing capabilities within each of the network elements.

As noted above, communication between the various OPC groups 220, 230, 240 in DCC group 210 is provided by links 252, 254. Links 252, 254 can be implemented using the SONET DCC overhead bytes. In the preferred embodiment, a DCC group can include over a hundred network elements. In effect, the various communication links within DCC group 210 allow the computers within the network elements to operate as a local area network (LAN). To access a particular DCC group, collectors 271–273 need only dial a number associated with a network element that is directly connected to switch 56 network 260. Thereafter, collectors 271–273 are provided with complete access to any of the network elements in the chosen DCC group.

Through the use of the craft interface at network element ports 236 and 248, collectors 271–273 are allowed to retrieve significantly more information from a network element as compared to OPC 130. For example, in addition to the predefined set of alarm and performance data, collectors 271–273 can also retrieve card level inventory data (e.g., serial numbers and software versions), quadrant layout information, laser bias information, etc. Effectively, all information known to the network element computer is retrievable via craft interface ports 236, 248.

Figure 5:
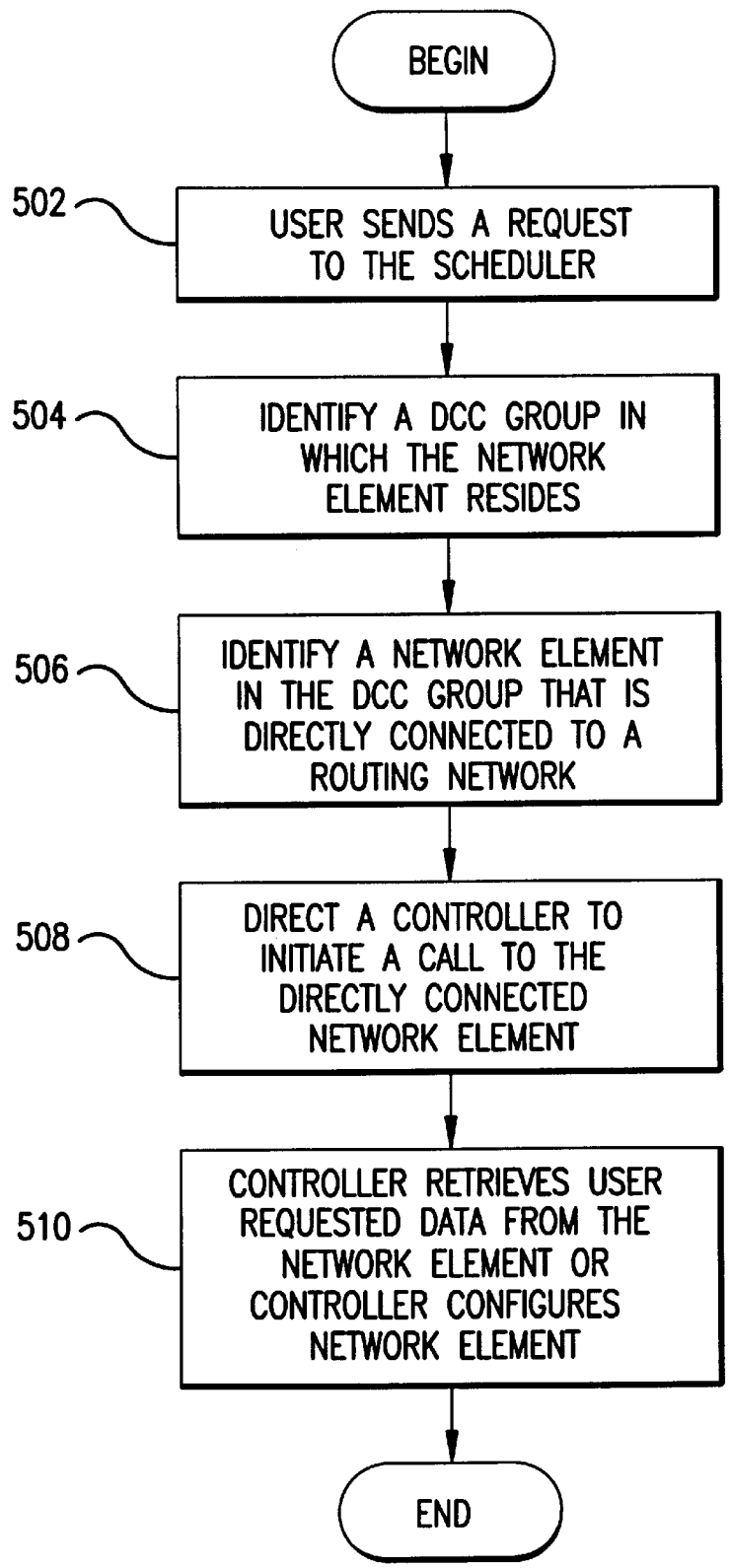
FIG. 5 illustrates a flow chart of the data retrieval process.

Generally, any user associated with the service provider organization can direct one of collectors 271–273 to query a specific network element within the service provider's network. FIG. 5 illustrates a flow chart of the user-initiated query process. First, at step 502, a user sends a request to server 284 for access to information in a network element. This request includes information that identifies a network element and the type of network management data that is sought to be retrieved from the network element. In one embodiment, server 284 uses the received request to generate a series of instructions that allow a collector 271–273 to navigate through a series of menu screens. In an alternative embodiment, the request itself includes script information that directs a collector's navigation through a series of menus screens. The use of menu screens to retrieve network element data is described in greater detail below.

In one example, a user may spontaneously request information on the operating condition (e.g., laser bias information) of a specific network element. In other examples, a user may schedule a series of periodic requests that seek to gather information from a group of network elements. These periodic requests may seek to gather card-level inventory information, quadrant layout information, etc. from all of the network elements in the network for tracking purposes. In either case, server 284 processes the requests by identifying the connections to be made by collectors 271–273.

At step 504, server 284 identifies the DCC group in which the network element specified by the user resides. Next, at step 506, server 284 identifies one of the network elements in the DCC group that is directly connected to switch 56 network 260. In the example of FIG. 2, network elements 232 and 244 of DCC group 210 are directly connected to switch 56 network 260. Each of these directly connected network elements is assigned an identifying number that is used by collectors 271–273 in making a call.

At step 508, server 284 instructs one of collector 271–273 to make a call to a directly connected network element. Communication with the directly connected network element allows one of collectors 271–273 to access the information in any of the network elements in the DCC group. This access is provided by the LAN-like configuration that is created by the communication links that interconnect the network elements in the DCC group. Once communication has been established with the network element, collector 271–273 can then retrieve the data requested by the user. This process is represented by step 510.

The retrieval process at step 510 is facilitated by the emulation by collectors 271–273 of a dumb VT100 terminal typically used in a craft interface connection. Through this emulation process, a collector 271–273 can navigate through a series of menu screens to identify the menu option that will produce the data requested by the user.

Figure 4:
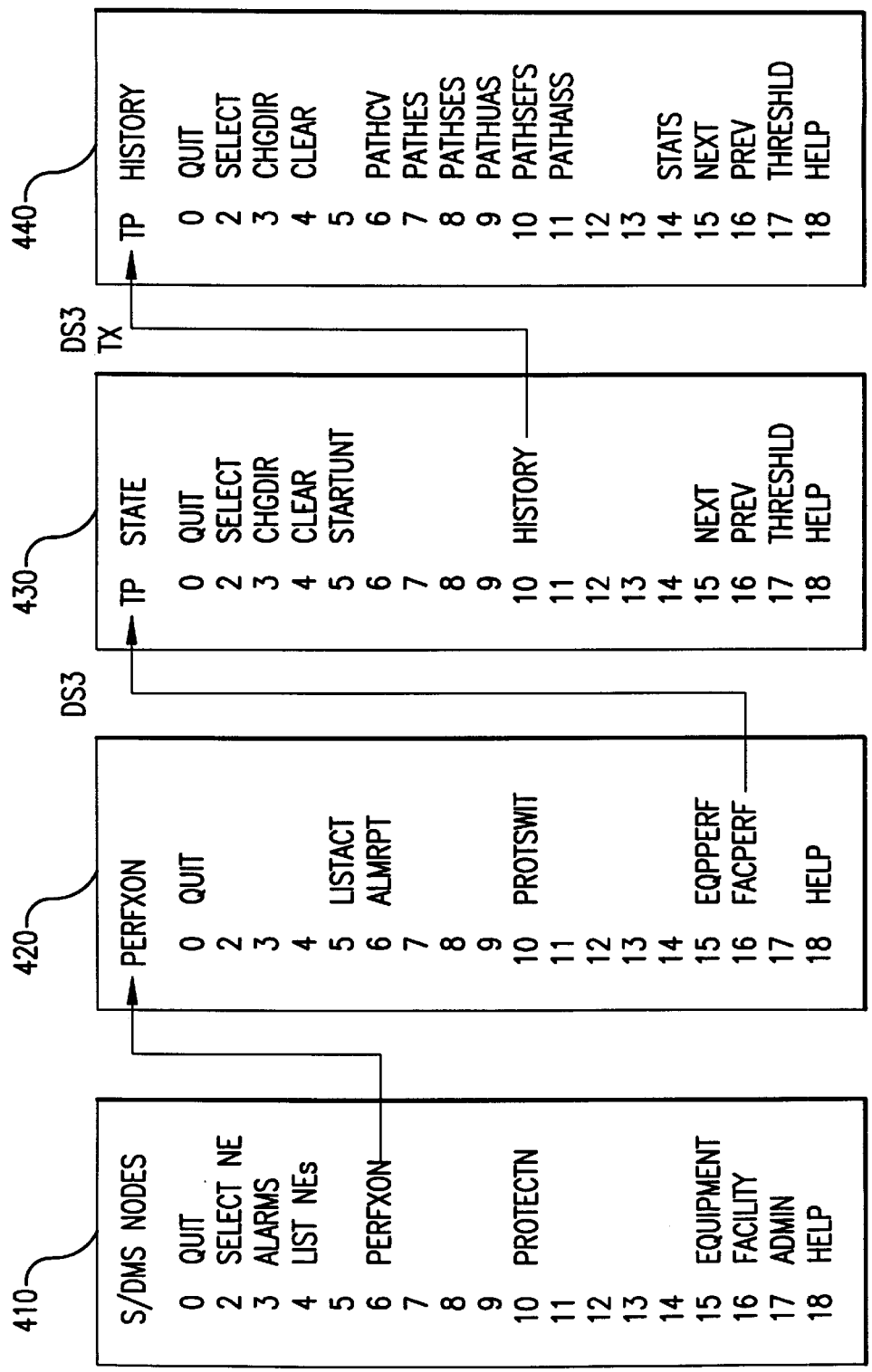
FIG. 4 illustrates an example of a series of menus that are navigated through the craft interface of a network element.

An example of a sequence of menu screens 410,420,430, 440 used in the communication between collectors 271–273 and the network elements is illustrated in FIG. 4. Menu screens 410, 420, 430, 440 are typically defined by the vendor. Starting at menu screen 410, a collector 271–273 automatically selects the type of information to be extracted. Options include alarm information (3), performance monitoring information (6), protection information (10), facility information (16), etc.

In the example of FIG. 4, a collector 271–273 automatically chooses in sequence, the choice of the performance monitoring option (6) in menu screen 410, the facility performance option (16) in menu screen 420, and the history option (10) in menu screen 430. At menu screen 440, collector 271–273 is presented with various performance monitoring parameters that can be retrieved. For example, collector 271–273 can select the historical data for path-level errored seconds (PathES) or path-level severely errored seconds (PathSES). After collector 271–273 selects a specific parameter identified by the user request, the computer in the network element being queried returns a result to be displayed on the emulated VT100 screen. The result to be retrieved is obtained by a "screen-scraping" method. In this process, the collector receives data to be displayed on a VT100 screen. This display data is in a data format that includes row position information, column position information, and ASCII encoded text to be displayed at the specified row and column positions. Since a collector 271–273 knows the position at which the returned result is to be displayed, the collector 271–273 can extract the ASCII encoded information that is associated with the known row and column position identifiers. Thereafter, the ASCII coded information is converted and stored in database 290.

Database 290 stores network element data extracted by collectors 271–273 in response to user requests that are generated by any user associated or authorized by the service provider. As noted above, most of this network element data is not available through conventional network management system 100. As a further benefit, information stored in database 290 can be extracted and analyzed by any user or group associated with the service provider. Thus, while network management system 100 typically provides performance data reports for specific network elements, network management system 200 allows the generation of reports on a network-wide basis. For example, trend statistics can be generated across multiple network elements. These trend statistics allow network management to be performed properly at a higher network level rather than at the network element level.

Figure 6:
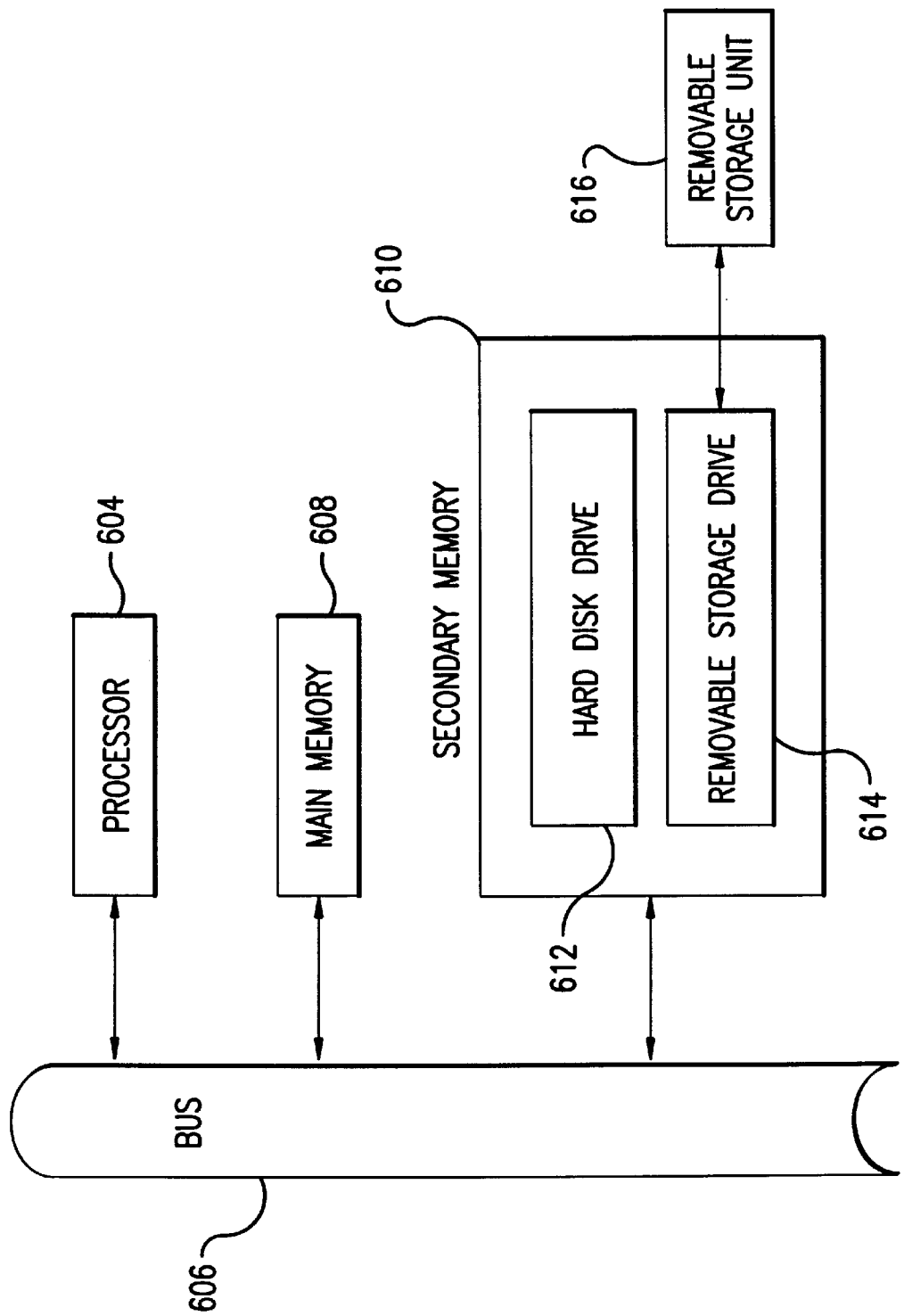
FIG. 6 illustrates a block diagram of a computer useful for implementing elements of the present invention.

In one embodiment, elements of the invention are implemented in one or more computer systems operating as discussed herein. For example, collectors 271–273, scheduler 282, server 284, reporter 286 and elements in DCC group 210 are implemented using computer systems. An exemplary computer system 602 is shown in FIG. 6. The computer system 602 includes one or more processors, such as processor 604. The processor 604 is connected to a communication bus 606.

The computer system 602 also includes a main memory 608, preferably random access memory (RAM), and a secondary memory 610. The secondary memory 610 includes, for example, a hard disk drive 612 and/or a removable storage drive 614, representing a floppy disk drive, a magnetic tape drive, a compact disk drive, etc. The removable storage drive 614 reads from and/or writes to a removable storage unit 616 in a well known manner.

Removable storage unit 616, also called a program storage device or a computer program product, represents a floppy disk, magnetic tape, compact disk, etc. As will be appreciated, the removable storage unit 616 includes a computer usable storage medium having stored therein computer software and/or data.

Computer programs (also called computer control logic) are stored in main memory and/or the secondary memory 610. Such computer programs, when executed, enable the computer system 602 to perform the features of the present invention as discussed herein. In particular, the computer programs, when executed, enable the processor 604 to perform the features of the present invention. Accordingly, such computer programs represent controllers of the computer system 602.

In another embodiment, the invention is directed to a computer program product comprising a computer readable medium having control logic (computer software) stored therein. The control logic, when executed by the processor 604, causes the processor 604 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant art(s).

While the invention has been particularly shown and described with reference to preferred embodiments thereof, it will be understood by those skilled in the relevant art that various changes in form and details may be made therein without departing from the spirit and scope of the invention.

What is claimed is:

1. A system for retrieving network element data, the system comprising:
   means for receiving a request from a user to retrieve data from a first network element in a network arranged as a plurality of data communication channel groups, each data communications channel group including a plurality of network elements that are interconnected by a plurality of data communication channel links;
   means for identifying a data communication channel group that includes said first network element;
   means for identifying a second network element in said data communication channel group that is directly connected, via a craft interface port on said second network element, to a routing network; and
   means for directing a collector means to initiate a call to said second network element, wherein said collector means retrieves data requested by said user from said first network element via data communication channel links between said second network element and said first network element.

2. The system of claim 1, wherein said request is a request to retrieve card-level inventory data.

3. The system of claim 1, wherein said request is a request to retrieve quadrant layout information.

4. The system of claim 1, further comprising a means for generating a series of instructions that allows said collector means to navigate through a series of menu screens.

5. The system of claim 1, wherein said request includes script information that directs said collector means to navigate through a series of menu screens.

6. The system of claim 1, further comprising a means for scheduling a periodic series of requests to retrieve configuration information from the network elements in the network.

7. The system of claim 6, wherein said configuration information includes card-level inventory data or quadrant layout information.

8. The system of claim 1, further comprising:
   means for emulating a VT100 terminal; and
   means for retrieving data from a network element via a screen scraping method.

9. A method for retrieving network element data, the method comprising the steps of:
   (1) receiving a request from a user to retrieve data from a first network element in a network arranged as a plurality of data communication channel groups, each data communications channel group including a plurality of network elements that are interconnected by a plurality of data communication channel links;
   (2) identifying a data communication channel group that includes said first network element;
   (3) identifying a second network element in said data communication channel group that is directly connected, via a craft interface port on said second network element, to a routing network; and
   (4) directing a collector means to initiate a call to said second network element, wherein said collector means retrieves data requested by said user from said first network element via data communication channel links between said second network element and said first network element.

10. The method of claim 9, wherein said step (1) comprises the step of receiving a request from a user to retrieve card-level inventory data.

11. The method of claim 9, wherein said step (1) comprises the step of receiving a request from a user to retrieve quadrant layout information.

12. The method of claim 9, further comprising the step of:
   (5) generating a series of instructions that allows said collector means to navigate through a series of menu screens.

13. The method of claim 9, wherein said step (1) comprises the step of receiving a request from a user that includes script information that directs said collector means to navigate through a series of menu screens.

14. The method of claim 9, further comprising the step of:
   (5) scheduling a periodic series of requests to retrieve configuration information from the network elements in the network.

15. The method of claim 14, wherein said step (5) comprises the step of scheduling a periodic series of requests to retrieve card-level inventory data or quadrant layout information.

16. The method of claim 9, further comprising the steps of:
   (5) emulating a VT100 terminal; and
   (6) retrieving data from a network element via a screen scraping method.

17. A computer program product, comprising:
   a computer usable medium having computer readable program code means embodied in said medium for managing program execution, said computer readable program code means comprising:
   computer readable program code means for causing a computer to receive a request from a user to retrieve data from a first network element in a network arranged as a plurality of data communication channel groups, each data communications channel group including a plurality of network elements that are interconnected by a plurality of data communication channel links;
   computer readable program code means for causing a computer to effect an identification of a data communication channel group that includes said first network element;

computer readable program code means for causing a computer to effect an identification of a second network element in said data communication channel group that is directly connected, via a craft interface port on said second network element, to a routing network; and computer readable program code means for causing a computer to direct a collector means to initiate a call to said second network element, wherein said collector means retrieves data requested by said user from said first network element via data communication channel links between said second network element and said first network element.

* * * * *